Patented May 23, 1944

2,349,514

UNITED STATES PATENT OFFICE 2,349,514

PROCESS FOR DEODORIZING AND DECOLORIZING LEVULINIC ACID

Wendell W. Moyer, Decatur, Ill., assignor to A. E. Staley Manufacturing Company, Decatur, Ill., a corporation of Delaware No Drawing. Application July 20, 1942,
Serial No. 451,656

12 Claims. (Cl. 260—526)

The present invention relates to the manufacture of levulinic acid. More particularly, it pertains to improvements in the manufacture of a technical grade of levulinic acid in which undesirable odor and color are permanently removed to provide a more desirable commercial product, and the provision of such a stabilized acid is a particular object of the invention.

In accordance with the disclosures of my United States Patent No. 2,270,328, there is set forth a process for the manufacture, industrially, of levulinic acid by heating a hexose sugar, such as dextrose, in aqueous solution with hydrochloric acid. The final step of this process illustrates the recovery of a technical grade of levulinic acid by distillation of the crude concentrated acid under diminished pressure. The freshly distilled levulinic acid so made is a pale, straw-colored liquid. It has a characteristic pungent odor which has been variously described as resembling that of burnt sugar or maple. Experience has shown that this odor cannot be removed by redistillation or other conventional means of deodorizing liquids. The odor, which is particularly objectionable in some of the more important applications of levulinic acid, appears to result from an impurity that is present in an extremely small amount.

Upon standing for a number of weeks a technical grade of levulinic acid, which at first is light yellow in color, gradually turns darker until it assumes a reddish brown color. The gradual discoloration of the technical acid may not be so great a drawback as the presence of the maple-like odor which is usually undesirable but it is advantageous to supply a light colored product, especially for certain applications such as, for example, when used in the plastics field. On occasion, however, the maple odor given off by the levulinic acid has been regarded at times as of some advantage.

To this end it becomes particularly desirable to produce that which is in greatest demand, i. e., a technical grade of levulinic acid which has been freed of any undesirable odor as well as freed of any undesirable color. On the other hand, by my discovery I am able to provide a technical grade of levulinic acid wherein either one or both of these characteristics can be eliminated depending on whether or not they are undesirable for the purposes for which such acid is intended.

It will also be noted that in accordance with the principles of my discovery I am able to produce a technical grade of levulinic acid which has characteristics distinguishable from pure levulinic acid such as, for example, that prepared by repeated recrystallization of the frozen technical acid. The product resulting from my herein described process is free of any undesirable odor or color and has distinct stabilized characteristics.

Many materials have been tried in attempts to prepare a superior grade of technical levulinic acid by destroying any objectionable or undesirable odor and color. Redistillation and treatment with absorbent carbons and earths have proven unsuccessful. Numerous chemical agents including reducing agents and oxidizing agents well known for their decolorizing characteristics, and from which reactions might reasonably be expected which could be made successfully to function in producing a decolorized and deodorized levulinic acid, have, on the contrary, proved deleterious or ineffective. Such agents included chromic salt, permanganate, chlorine, and the like but their use has met with uniform failure, either satisfactorily to bleach or satisfactorily to deodorize the technical grade of levulinic acid. In fact, the characteristics of levulinic acid apparently are such as to make it appear that the problem involved in its deodorization and decolorization does not comply with expected decolorizing and deodorizing characteristics.

More specifically, therefore, it is a further object of the invention to provide a process which will permanently destroy any undesirable and objectionable odor of a technical grade of levulinic acid with sodium chlorite and to stabilize as well as to remove any undesirable or objectionable color with hydrogen peroxide and to prevent gradual darkening and discoloration thereof during storage, to the end that this will cause the product to widen its field of usefulness and make it available for valuable applications from which it heretofore has been excluded.

Another object of the invention is the provision of a process which will specifically remove any undesirable odor from a technical grade of levulinic acid without particular regard to the ultimate color which is developed.

A still further object is the provision of a process which will permanently bleach a technical grade of levulinic acid without particular regard to the removal of more or less of its odor.

Other objects of the invention will in part be obvious and will in part appear hereinafter.

The invention accordingly comprises the several steps and the relation of one or more of such steps with respect to each of the others thereof which will be exemplified in the process hereinafter disclosed, and the scope of the application of which will be indicated in the claims.

My invention is based on the discovery of the uniqueness of the phenomena that two such oxidizing agents as sodium chlorite and hydrogen peroxide are in no respect interchangeable for such purposes but that, on the contrary, while the sodium chlorite successfully deodorizes a technical grade of levulinic acid very rapidly, any bleaching which it might have is only temporary and the color will have returned upon standing; and furthermore that whereas hydrogen peroxide is not significantly effective for deodorizing it does slowly bleach and decolorize the technical acid in such a way that it remains permanently decolorized.

More specifically, and in accordance with the underlying principles of my discovery, I have found that highly improved grades of technical levulinic acid can be produced by treating the distilled acid with sodium chlorite and hydrogen peroxide, separately, or together, as well as with or without each other depending upon the nature of the ultimate product which it is desired to obtain. The two reagents as above stated are both oxidizing agents, but do not have identical effects on the levulinic acid and are not equivalents of each other or of other kinds of ineffective oxidizing agents. Sodium chlorite has a very rapid reaction on the acid which involves the destruction of any objectionable and undesirable odor and while there is a mild bleaching of the acid to a pale lemon color, this color is not stabilized, the initial light color gradually turning darker over a period of days but any undesirable odor is permanently eliminated. The action of hydrogen peroxide is very slow and involves a gradual bleaching of the acid to a lighter color. Hydrogen peroxide does not destroy or even minimize the objectionable odor to any significant extent. A technical grade of levulinic acid having once been discolored by long storage an uneconomically large quantity of hydrogen peroxide is required to bleach the acid to a light color and for this reason I prefer to employ the bleaching effect of the hydrogen peroxide as soon as feasible after the removal of any objectionable odor. Hydrogen peroxide is also best used in small quantity on freshly distilled levulinic acid or sodium chloride deodorized levulinic acid as a color stabilizing agent.

As an example of the operation of the process in connection with the sodium chlorite treatment, 100 parts by weight of technical grade of levulinic acid was added with constant stirring to a solution formed by dissolving 0.5 part by weight of anhydrous sodium chlorite in 0.5 part by weight of warm water. Reaction involving deodorization and bleaching took place at once with a noticeable evolution of chlorine dioxide. The treated mixture was allowed to stand for some time. Preferably this is between one to three days. During this time a certain amount of insoluble material separates and may be removed in any suitable manner but preferably by filtration of the treated acid. If desired, the treated acid can be placed in an evaporator and the excess water removed under diminished pressure.

With respect to the quantity of sodium chlorite used I have found that between 0.1 and 1.0 per cent by weight based on the levulinic acid present is desirable, the preferred range, however, being from 0.3 to 0.8 per cent. With respect to the method employed it will be observed that a preferred procedure is first to dissolve sodium chlorite in a minimum amount of water and then add the solution. However, it should be understood that finely ground anhydrous sodium chlorite can also be added directly to the levulinic acid gradually without danger, although in this case reaction is slower and a longer stirring time is required to effect reaction between the solid and liquid phases.

As to the time element I have found that the deodorization reaction is very rapid, being essentially completed within ten minutes. Since the deodorized acid should stand awhile before separation of the insoluble material which has precipitated, there is ample time available for a residual reaction.

Regarding the temperature best suited to the reaction I have found that at around 25° to 30° C. the reaction will proceed rapidly. I have also observed that below 25° C. the levulinic acid may partially crystallize.

To remove any free and dissolved gas, air or inert gas can be blown through the treated levulinic acid or it can be subjected to sub-atmospheric pressure which will not affect the quality of the treated acid.

When aqueous sodium chlorite is used the excess water can readily be removed at any time after the first few minutes after the completion of the reaction. Preferably, it is desirable to remove water by vacuum distillation at as low a temperature as possible in order to avoid further discoloration of the product by heat. If water is to be removed, this preferably should be done before separation or filtration.

It will be observed that the treated acid develops a cloudy haze due to separation of finely divided solid material. This material can be removed or separated preferably by filtration with the use of a filter aid. It requires from about one to three days for all of the insoluble precipitate to come out, and hence the treated levulinic acid should preferably stand before filtering for a period of time within this range.

After the deodorization treatment has been completed and it is desired permanently to bleach the deodorized levulinic acid the acid is subjected to an hydrogen peroxide treatment as follows: To a freshly deodorized technical grade of levulinic acid is added "100 volume" hydrogen peroxide which contains at least 27.5 per cent by weight of hydrogen peroxide. A critical condition is the quantity of peroxide used, which may be varied considerably according to the degree of color stability desired. For most purposes the weight per cent of pure hydrogen peroxide based on the levulinic acid to be used varies preferably in the range of 0.05 to 0.2 per cent. For example, a technical grade of levulinic acid having greatly improved color stability is obtained by adding one part by weight of commercial "100 volume" hydrogen peroxide to 500 parts by weight of levulinic acid. This corresponds to about 0.055 per cent by weight of hydrogen peroxide. Up to ten times this quantity of hydrogen peroxide may be used, depending upon the yield of application of the product.

The deodorizing treatment by means of the sodium chlorite and the decolorizing treatment by means of the hydrogen peroxide are preferably combined to produce a technical grade of levulinic acid free from objectionable and undesirable odor and having improved color stability. Free hydrogen peroxide, which is preferred in any application herein, can be added to the sodium chlorite treated levulinic acid preferably just after the filtration step, although good results can also be obtained by adding the two reagents one after the other at the first step of the process. The conditions applicable to the individual processes also apply to the combined processes.

It will thus be seen that the objects hereinbefore set forth may readily and efficiently be obtained and since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process of deodorizing and decolorizing a technical grade of levulinic acid, which comprises subjecting said acid to reaction with a deodorizing quantity of sodium chlorite and a decolorizing quantity of hydrogen peroxide, and continuing said reaction until all undesirable odor and color has been removed.

2. A process of deodorizing and decolorizing technical levulinic acid, which comprises subjecting said acid to reaction with a deodorizing quantity of sodium chlorite until all undesirable odor has disappeared, separating insoluble material formed as the result of said reaction, and thereafter subjecting the remaining deodorized levulinic acid to reaction with a decolorizing amount of hydrogen peroxide until all undesirable color has been removed.

3. A process of deodorizing and decolorizing technical levulinic acid, which comprises subjecting said acid to reaction with a deodorizing quantity of sodium chlorite until all undesirable odor has disappeared, allowing said acid to clarify by standing until any objectionable finely divided solid material has been precipitated, separating the resulting precipitate and subjecting the remaining deodorized levulinic acid to reaction with a decolorizing quantity of hydrogen peroxide until all undesirable color has been removed.

4. A process according to claim 3 in which the quantity of sodium chlorite ranges between about 0.1 and 1.0 per cent by weight based on the levulinic acid.

5. A process according to claim 3 in which the quantity of sodium chlorite ranges preferably between about 0.3 to 0.8 per cent based on the weight of levulinic acid.

6. A process according to claim 3 wherein an aqueous solution of sodium chlorite is reacted with said levulinic acid, the resulting water being removed at any time after the first few minutes following completion of said reaction and before separation of said insoluble materials.

7. A process according to claim 3 in which the clarifying period of standing is between about one to three days.

8. A process according to claim 3 in which said reactions are carried out at a temperature range around approximately between 25° to 30° C.

9. A process according to claim 3 in which the hydrogen peroxide ranges from around 0.055 to 0.50 per cent based on the weight of the levulinic acid.

10. A process according to claim 3 in which the hydrogen peroxide ranges preferably from about 0.05 to 0.2 per cent based on the weight of the levulinic acid.

11. In a process for the production of a deodorized technical grade of levulinic acid, the improvement which comprises subjecting said acid to reaction of a deodorizing quantity of sodium chlorite until all undesirable odor has been removed.

12. In a process for the production of a decolorized technical grade of levulinic acid, the improvement which comprises subjecting said acid to reaction of sodium chlorite rapidly to deodorize the same, and thereafter subjecting the deodorized acid to the action of a decolorizing quantity of hydrogen peroxide until all undesirable color permanently has been removed.

WENDELL W. MOYER.